UNITED STATES PATENT OFFICE.

DAVID R. KNAPP, OF POTTSVILLE, PENNSYLVANIA.

METHOD FOR MANUFACTURING STEEL.

1,361,589.             Specification of Letters Patent.      Patented Dec. 7, 1920.

No Drawing.      Application filed January 20, 1920. Serial No. 352,851.

*To all whom it may concern:*

Be it known that I, DAVID R. KNAPP, a citizen of the United States, and a resident of Pottsville, county of Schuylkill, State of Pennsylvania, have invented certain new and useful Improvements in Methods for Manufacturing Steel, of which the following is a specification.

Some of the objects of the present invention are to provide an improved method for the manufacture of steel; to provide a method whereby a greater production of steel is possible than by processes in present use; to provide a method whereby the quality of the steel is under control at all times; to provide a method for manufacturing steel at a temperature lower than ordinarily employed in open hearth processes; to provide a method whereby the formation of skull scrap is eliminated; to provide a method whereby the furnace repairs are reduced to minimum; to provide a method whereby the deposit of ash in the checker chambers is materially reduced and the efficiency of the regenerators correspondingly increased; to provide a method whereby the plant operation is improved; and to provide other improvements as will hereinafter appear.

The method of the present invention in its initial step or steps follows substantially the standard practice of steel manufacture in that it is carried out by stationary or tilting furnaces of large capacity, preferably of sixty tons or over, in which the normal charge is placed. This charge consists of the required amount of steel scrap and carbon, the latter being in the form of pig iron, scrap cast iron, or carbon in the form of coal, charcoal or any other suitable material, together with the necessary amount of fluxes, oxids and proper elements to bring the steel to the correct chemical analysis except as to manganese, which according to standard practice is added in desired amount to the ladle while tapping inasmuch as the greater portion is oxidized in the bath. Where pig iron is cheap or compares favorably in price to scrap steel it is generally used as a convenient form to furnish carbon, but when market conditions are unfavorable this pig iron can be replaced by scrap cast iron or other material suitable to supply the required amount of carbon. Thus with the charge complete and the furnace in operation the carbon assists the flame in oxidizing the metalloids, creating heat in the bath, and causing a conversion which produces steel in molten form of the correct chemical analysis and temperature for tapping.

From the stage where the steel is in condition for tapping, the method of the present invention differs from the ordinary well known or standard process. In the latter process the whole heat is tapped in a ladle, poured into molds for ingot formation and the furnace then recharged, while in the method of the present invention the steps to complete the method include only a partial removal and a partial recharging so that the furnace is substantially in continuous operation. Thus in carrying out the present invention it is preferable to first change the flame from an oxidizing one to one of a reducing character and then in tapping, pouring or dipping to remove only a relatively small quantity of the molten metal, preferably just sufficient to fill one ingot mold, or approximately five per cent. of the total charge which might be tapped. In case a tilting furnace is used the portion of the metal withdrawn may be poured directly into the ingot mold, while if a stationary furnace is in use a suitable receptacle may be employed to dip out the required quantity of metal and pour it into the ingot mold. Following the removal of the hot metal an equivalent amount of cold metal with sufficient fluxing and oxidizing material, if necessary, is placed in the furnace to replace that withdrawn by the partial tapping. The cold material consists of scrap metal of light character such as turnings, bundles or the like and if carbon is needed portions of this scrap metal can be of cast iron, high carbon steel scrap or partly of other forms of carbon. Where steel scrap is used its chemical analysis should correspond as near as possible to that of the melted steel in the furnace. It will be understood that the added material is of a nature to give a predetermined result, namely, to combine with the molten steel without varying or changing the chemical analysis of the steel then in the process of making and the proportions of the added quantities are such as to maintain the bath and slag in correct proportion, chemically and as to quantity. Furthermore by the change of the flame to a reducing one the residual carbon is preserved in the bath and little additional carbon will be necessary so that the cold charge may consist chiefly of steel scrap. As the charge of scrap and fluxes will be relatively small compared to the molten metal remaining in the furnace, it will melt very rapidly and be assimilated by the bath in a comparatively short space of time with the result that the furnace is ready for another tapping, pouring or ladling operation very quickly. At each metal removing step the same quantity of metal is removed and replaced by a cold charge, the method thus continuing as an alternate removing and charging operation. As successive quantities of metal are removed, manganese or other desirable elements are added to the contents of the amount withdrawn, these additions being, preferably, in the form of hot liquid material, or finely divided material.

As a further step in the present method it is desirable, at certain regular intervals, to remove a portion of the slag from the furnace, any well known means being employed for that purpose. This step is usually necessary owing to the increase in the slag contents of silica, phosphoric acid and sulfate of lime. The usual way to bring the slag back to a limey condition or balanced state relative to the steel is to add calcium carbonate though other means may be employed as will be understood.

By the method of the present invention a greater production of steel is possible because there is no time wasted in reaching the pouring temperature, or as it is called "getting the heat hot." In processes heretofore and at present in use considerable time is consumed in pouring the material into the molds. During this time the material is cooling off so that it is necessary, in order to compensate for this temperature loss, to hold the material in the furnace until a temperature is reached that will insure pouring. As the "getting the heat hot" time sometimes consumes from ten to twenty per cent. of the total time the material is in the furnace, it will be evident that the elimination of this time loss is a considerable item. Further when the heat has melted it may be "hard" which indicates an excess of carbon. The removal of the excess of carbon is accelerated by the charging of iron oxid in the form or iron ore, wherein the oxygen combines with the carbon in the bath and passes off as burnt gas, the metallic iron going to the bath, or the heat may melt "soft" indicating a lack of carbon which is usually supplied by adding pig iron to the bath. The "hard" and "soft" conditions cannot be predetermined to any accuracy and considerable time is lost in adjusting these conditions. In the method of the present invention these conditions do not exist except to a small degree which can be corrected while charging the cold charge. When the chemical condition is correct the material will be fluid enough to remove the predetermined relatively small portion while a relatively uniform temperature is maintained and the furnace is in substantially continuous operation.

Furthermore by the present invention the chemical condition of the material in the furnace can be maintained uniform as any change in its condition can be detected at once and the necessary elements added or subtracted to restore the desired condition while the furnace is in a producing condition. Under the standard processes now in use an entire heat may go wrong because of the slag being incorrectly balanced, or not of the correct quantity or because of the segregation of certain elements whereby certain oxids of a detrimental nature remain in the steel and the condition is not discovered until the steel is in the rolling process. When the defect is discovered the entire heat has been tapped and before rolling conditions are restored the furnace charge has to be varied to meet the condition. In the method of the present invention it is possible to constantly analyze the steel and adjust or regulate at will the chemical elements and maintain a correct balance, all of which is done while the furnace is in a producing condition. Thus instead of losing an entire heat through a variation in the condition of the steel only a small fraction of the total would be tapped before the defect would be discovered in the rolling mill.

Another saving by the method of the present invention is in the elimination of "skull scrap." This type of scrap is formed when the whole charge is poured into a relatively cold ladle and then allowing the hot metal to run slowly from the bottom of the ladle through a suitable nozzle. As this is a slow step a certain amount of steel solidifies around the inside walls and the bottom of the ladle forming skull scrap which must be broken in small pieces and recharged. In the present invention the receptacle for removing the desired portion of molten metal is submerged in the bath where it becomes coated with hot slag and the heated condition from constant use prevents any steel from adhering to the receptacle.

In view of the fact that the method of the invention maintains the furnace at a substantially constant temperature the silica brick from which the walls and roof are constructed is not subjected to expansion and contraction and consequently has a longer life. When furnaces are wholly charged with cold material they are usually filled far above the slag line, generally until no more material can be gotten in, with the result that the back walls and roofs are damaged mechanically. Further when the charge begins to melt the melted silicon will seek calcium carbonate for slag formation. The calcium carbonate is charged on the bottom of the furnace in the form of lime or limestone and cannot be reached during the melting down process, hence it combines with the calcium carbonate that it can find in the bank making material which is usually dolomite. This action results in severe cutting of the banks which necessitates repairs after each heat is tapped. In the present invention the charge is always in a molten condition and the silicon in the small replacement charge will readily associate with the slag instead of seeking the banks for the required amount of calcium carbonate, whereby repair costs are materially reduced.

Also under the present invention the checker chambers are kept relatively free from ash because the latter is now deposited in the slag. Ash from the burning fuel and unburnt fuel passes over the furnace hearth and to the regenerators where it is deposited. This condition takes place during the melting down process due to the fact that the furnace is cold and there is no slag covering for the ash to adhere to, but when the material is maintained at a constant melting heat the liquid slag forms a blanket so that ash which formerly in other processes passes over to the checker chambers or regenerators will be deposited in the slag and the fuel will be completely burned.

The method of the present invention results in greatly improved plant operation because the finishing mills are supplied with a steady continuous flow of hot ingots instead of a large quantity coming at one time with long intervals between the supply. Where long intervals occur, cold ingots from stock are used which necessitates greater heating fuel and longer heating time.

The method as described relates principally to the basic open hearth process but the same can be readily applied to the acid open hearth process or any similar process where large quantities of cold material are melted and refined. It will also be understood that the present method of tapping the whole heat and handling the same will be maintained due to the fact that there will be times when it is desired to drain the entire bath, either for temporary shut down or for repairs.

Where in the foregoing reference is made to the step of recharging it should be noted that it is preferred to use a relatively small amount of pig iron and utilize almost exclusively scrap with an addition of charcoal so proportioned as to maintain the proper percentage of carbon in the melted steel. In carrying out the method using charcoal it is generally necessary to add an excess to allow for about .04% drop in carbon in the melted heat in about one half hour's time.

Having thus described my invention, I claim and desire to protect by Letters Patent of the United States:

1. The method of manufacturing steel which consists in initially charging a furnace, melting and refining the charge, removing a relatively small portion of the molten charge, and adding a relatively small portion of cold charging material to the molten bath.

2. The method of manufacturing steel which consists in initially charging a furnace, melting and refining the charge, removing a relatively small portion of the molten charge, adding a relatively small portion of cold charging material to the molten bath, and maintaining the slag in a predetermined chemical condition.

3. The method of manufacturing steel which consists in initially charging a furnace, melting and refining the charge, removing a portion only of the molten charge, and adding to the molten bath a sufficient quantity of cold charging material to restore the molten metal to its original volume.

4. The method of manufacturing steel which consists in initially charging a furnace melting and refining the charge, removing a portion only of the molten charge, adding to the molten bath a sufficient quantity of cold charging material to restore the molten metal to its original volume, and maintaining the bath at a substantially constant temperature.

5. The method of manufacturing steel which consists in initially charging a furnace, melting and refining the charge, removing only a sufficient quantity of the molten metal to fill one ingot mold, adding to the molten bath a sufficient quantity of charging material to restore the bath to its original volume, and maintaining the bath at a substantially constant temperature.

6. The method of manufacturing steel which consists in initially charging a furnace, melting the charge, refining the charge to a predetermined chemical condition, removing a portion only of the molten charge, and adding to the bath a sufficient quantity of cold charging material of predetermined quality to restore the bath to its original volume and maintain the predetermined chemical condition.

7. The method of manufacturing steel which consists in initially charging a furnace, melting and refining the charge to a molten condition, alternately removing a predetermined unit quantity of the molten metal and recharging the bath with a predetermined unit of cold charging material, and continuously maintaining the bath at a substantially constant temperature.

8. The method of manufacturing steel which consists in initially charging a furnace, melting and refining the charge, removing a portion only of the molten charge, and adding to the molten bath a sufficient quantity of cold scrap and carbon to restore the molten material to its original state and volume.

9. The method of manufacturing steel which consists in initially charging a furnace, melting and refining the charge, alternately removing a predetermined unit quantity of the molten metal and recharging the remaining molten bath with a predetermined unit of cold scrap metal and carbon, and maintaining the slag continuously in a predetermined chemical condition.

Signed at Pottsville in the county of Schuylkill and State of Penna. this 10th day of Jan., A. D. 1920.

DAVID R. KNAPP.